R. C. M. HASTINGS.

TELEPHONE SYSTEM.

APPLICATION FILED DEC. 27, 1917.

Reissued Apr. 27, 1920.

14,848.

4 SHEETS—SHEET 1.

*Inventor*

*R. C. M. Hastings*

*by Dennis Pelton Moore*

*Atty.*

R. C. M. HASTINGS.

TELEPHONE SYSTEM.

APPLICATION FILED DEC. 27, 1917.

Reissued Apr. 27, 1920.

14,848.

4 SHEETS—SHEET 2.

R. C. M. HASTINGS.

TELEPHONE SYSTEM.

APPLICATION FILED DEC. 27, 1917.

Reissued Apr. 27, 1920.

14,848.

4 SHEETS—SHEET 3.

Inventor

R. C. M. Hastings by David Pelton Moore, atty.

R. C. M. HASTINGS.

TELEPHONE SYSTEM.

APPLICATION FILED DEC. 27, 1917.

Reissued Apr. 27, 1920.

14,848.

4 SHEETS—SHEET 4.

Inventor

R. C. M. Hastings by David Peets Moore,

Atty.

UNITED STATES PATENT OFFICE.

RUBEN CHRISTOPHER MILLER HASTINGS, OF COLUMBUS, OHIO, ASSIGNOR TO INTERNATIONAL TELEPHONE CO., OF COLUMBUS, OHIO.

TELEPHONE SYSTEM.

14,848. Specification of Reissued Letters Patent. Reissued Apr. 27, 1920.

Original application filed April 11, 1912, Serial No. 690,014. Renewed August 20, 1913, Serial No. 785,818. Original No. 1,206,761, dated November 28, 1916. Application for reissue filed December 27, 1917, Serial No. 209,178.

*To all whom it may concern:*

Be it known that I, RUBEN C. M. HASTINGS, a citizen of the United States, residing at Columbus, in the county of Franklin and State of Ohio, have invented certain new and useful Improvements in Telephone Systems, of which the following is a specification, reference being had therein to the accompanying drawing.

The present invention relates to improvements in telephone systems, the primary object of the invention being the provision of an automatic call-up or ringing device, wherein by means of the insertion of the jack plug at the exchange, a ringing device will be automatically actuated at the called subscriber's set, the same being actuated continuously, the bell or buzzer ringing by intervals until the receiver at such called subscriber's set is removed from the hook, or until the jack plug is taken down, the removal of the receiver from the hook or the taking down of the jack plug opening the bell circuit and cutting out the ringing circuit.

A further object of the present invention is the provision of an automatic ringing device, which will employ a simple form of alarm, such as a low resistance electric bell or buzzer, and whereby the coils of the magnet therein in all of the various subscribers' sets will be of small resistance so that a predetermined battery force will properly actuate such alarm, said battery being furnished from the battery used in the instrument called.

A still further object of the invention is the provision of a means whereby the automatic ringing device will be energized by means of the introduction of a jack plug into a socket at the exchange, the introduction of such jack plug operating a selecting device in the various subscribers' sets to throw in line the selected called subscriber's set and actuate the alarm therein, while the ringing devices in the various other subscribers' sets will be cut out as well as their complete sets, the present apparatus being especially designed for use in connection with the regular telephone system as now installed, either with a series circuit or a loop circuit, or it may be used in connection with a selecting key and the system as illustrated in my U. S. Letters Patent No. 1,061,285, dated May 13, 1913, reissued Sept. 28, 1915, No. 13,989, covering a selective system of telephony.

Briefly stated the present invention will have a battery for operation that can be connected to a switch at the jack socket on single circuits, or to a selecting key on party line circuits, where this switch is controlled by the jack plug. In order that the ringing device will give an intermittent and not a steady ring, a slight change is made in the controlling of the bell clapper, as will later appear. In the present apparatus it is desired that the instrument upon the line shall be shunted or locked out of the circuit when not in use, but the same can be either locked or unlocked at all times as may be desirable.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
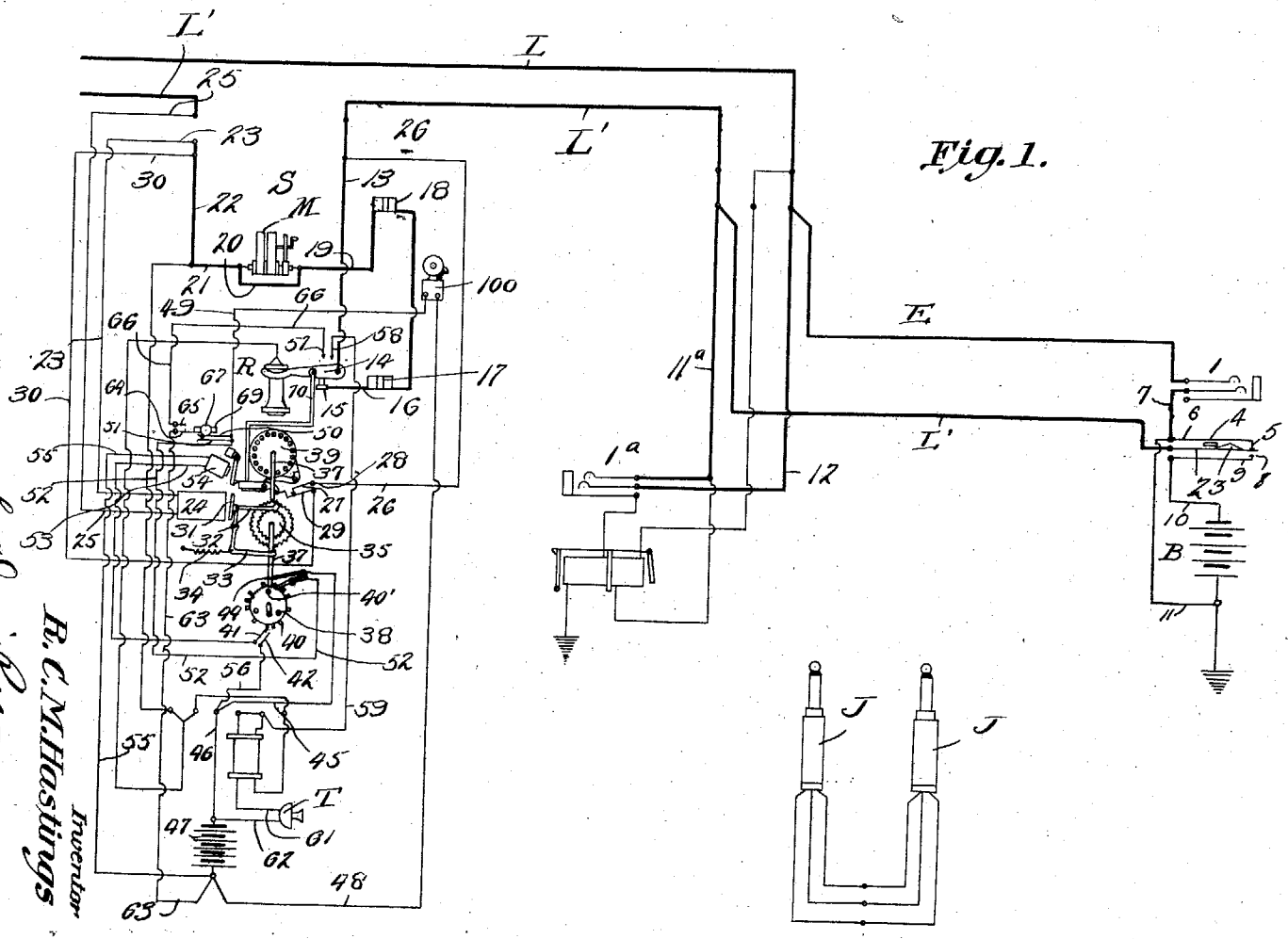
Figure 1 is a diagrammatic view illustrating the present invention as applied to the exchange and a single subscriber's set in an ordinary loop circuit without the employment of a selecting key.

In order to fully understand the present invention, the diagram of Fig. 1 will first be described in general, while the diagram of Fig. 2 will be taken up in its order directly after the description of the diagram of Fig. 1.

Referring to the drawings, E designates the exchange, and S one of the subscribers' sets, the two line wire L′ and L constituting a loop circuit connecting the exchange to the subscribers' sets, while in the exchange is the usual jack plug J and the calling jack plug J′. At the exchange there is located the calling jack socket 1 and the answering jack socket 1ª, these being of usual structure for the reception of the respective jack plugs before described.

Disposed in operable relation to the jack socket 1 is a switch or spring contact arm 2 carrying the abutment 3 which is normally held in the position as shown in Fig. 1, by means of the limiting means 4, the outer free end of the spring contact 2 being normally in contact with the point 5 connected to the conductors 6 and 7 through the jack plug to the line L, the spring contact 2 being connected to the line wire L′, when the jack plug is in the socket and completed through the usual cord. During the inserting of the calling jack plug in the calling jack socket 1, the projection of the spring contact 2 is momentarily engaged thereby and moved so that the free end thereof will engage the contact point 8, disengaging from the contact point 5. This action will throw an impulse into the line through the conductors 9, and 10, battery B, conductor 11, conductor 7, the calling jack J and socket 1 and the line L, and as the spring contact 2 is connected to the line L′, the battery B is thrown into the line as is the usual practice in calling with loop circuits. The two conductors 11ª and 12 connect the answering jack socket 1ª to the line wire L′ and L, respectively.

The subscribers' sets each constitute the branch conductor 13, which is led into and connected to the receiver hook 14 which normally when the receiver R is upon the hook is held downwardly and in contact with the contact 15, which in turn is connected to the conductor 16, the hinges 17 and 18 of the usual cabinet or casing for the call-up bell 100 and the other instruments, the conductors 19, 20 and 21 completing such circuit and the loop and practically constituting with the conductor 13, a shunt from the line wire L′. The magneto M is bridged across the conductors 19 and 21 through the usual armature shunt, so that if desired the magneto may be used for calling purposes only, when the subscriber is calling the exchange. This may be connected in any well known manner and is here shown, so that the transmission current will pass through the conductor 20, the line of least resistance.

Figure 3:
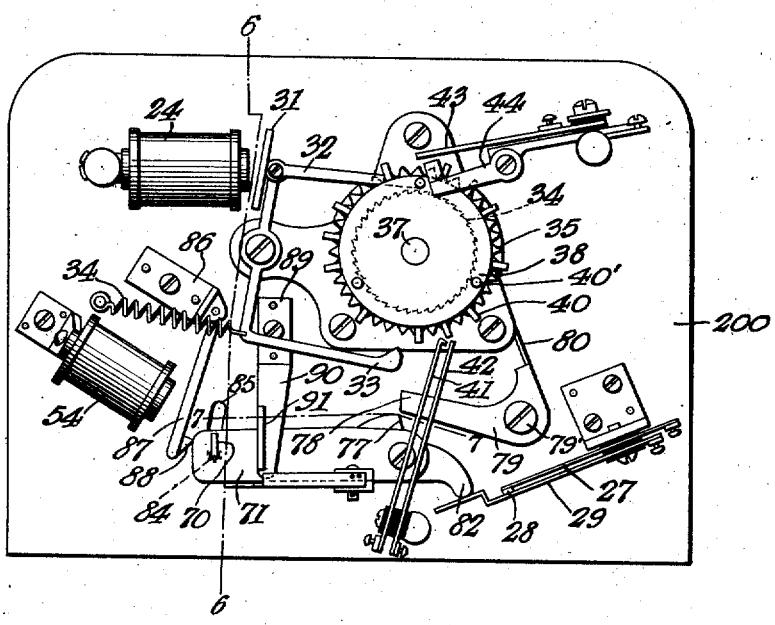
Fig. 3 is a front elevation of the receiver lock mechanism and the automatic ringer actuating mechanism, the parts being in normal position.

Connected to the line wire L′ is a conductor 23 which has connected therein the electromagnet 24, the conductor 25 leading from said electromagnet to the line wire L′. Thus it will be seen that the throwing of the batteries B into the line wires L′ and L will energize the electromagnet 24, the purpose of which will presently appear. Also shunted from the line wire L′ is a conductor 26, which leads into and is connected to a spring plate 27, whose point 28 normally engages the spring plate 29, said spring plate 29 being connected through the medium of a conductor 30 to the line wire L′ and bridged across beyond the main connection of the subscriber's set to said line wire L′, these shunt circuits forming means to shunt the transmitter and receiver from the line, as will presently appear. The armature 31 of the electromagnet 24 controls the two pawls 32 and 33, one of which is the operating pawl, while the other is a retrograde preventing or arresting pawl for the respective ratchet wheels 35 and 36, the spring 34 normally holding the respective pawls 32 and 33 in the position as shown in Fig. 3. These ratchets 35 and 36 are keyed upon to operate the shaft 37 which carries the two disks 38 and 39 The disk 38 is provided with a plurality of peripheral radially disposed pins 40, said pins being disposed in the path to engage the respective spring terminals or arms 41 and 42, said pairs of spring terminals being so disposed and arranged that contacts 41 and 42 are normally open, being closed as will later appear. The disk 38 is also provided with the pins 40′ which are disposed in the path, at the proper time, as will later appear, to close the normally open contact terminal 43 and 44.

Leading from the spring terminal 43 to the battery 47 are the conductors 45 and 46, while leading from the opposite side of the battery is a conductor 48 connected to the call-up alarm or buzzer 100. The other side of the buzzer or alarm 100 is connected by a conductor 49 to the upper spring contact 50, which is disposed to be normally in contact with the spring contact 51, which is connected to a conductor 52 which leads to the pivoted contact 44, whereby if either one of the pins 40 engage the pivoted contact 44, the circuit is closed to actuate the buzzer or alarm 100.

Connected to the contact arm 41 is a conductor 53, which is also connected to the electromagnet 54, and a conductor 55 leads from said electromagnet and is connected to the battery 47, the circuit being completed through the conductors 46 and 56 with the contact points 42. The purpose of this circuit is to energize the electromagnet 54 which will operate the receiver hook releasing pawl 87, the detail structure of which will appear later.

When the receiver hook 14 is raised after the substation has been called, the two contact points 57 and 58 are bridged so as to complete a circuit through the conductor 59, induction coil 60, conductor 61, transmitter T, conductor 62, battery 47, conductor 63, spring contacts 65 and 64, which are normally held open when the receiver is upon the hook, but automatically closed upon the rise of the hook as will later appear, said circuit being completed through the conductor 66 with the point 57. This circuit connects to the line, the transmitter T, so that a talking circuit is completed with the subscriber's set to the lines L, L′.

Figure 5:
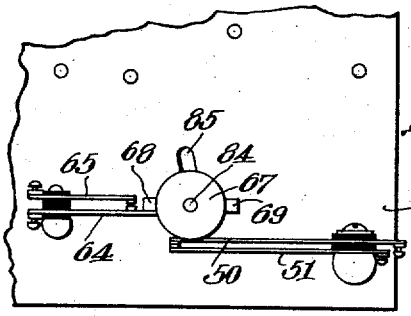
Fig. 5 is an enlarged detail view of one of the circuit connections in the automatic ringer circuit of each subscriber's set.
Figure 6:
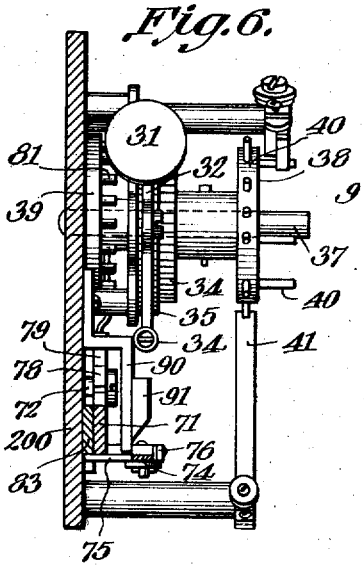
Fig. 6 is a section taken on line 6—6 of Fig. 3.

A vertically movable weight 67 is disposed to normally rest upon and close the contacts 50—51, and open the contacts 64—65, the weight 67 being provided with the lug 68 for actuating the contact 64 to separate it from the contact 65 as clearly shown in Fig. 5. This structure is clearly set forth in diagram in Fig. 1.

Figure 2:
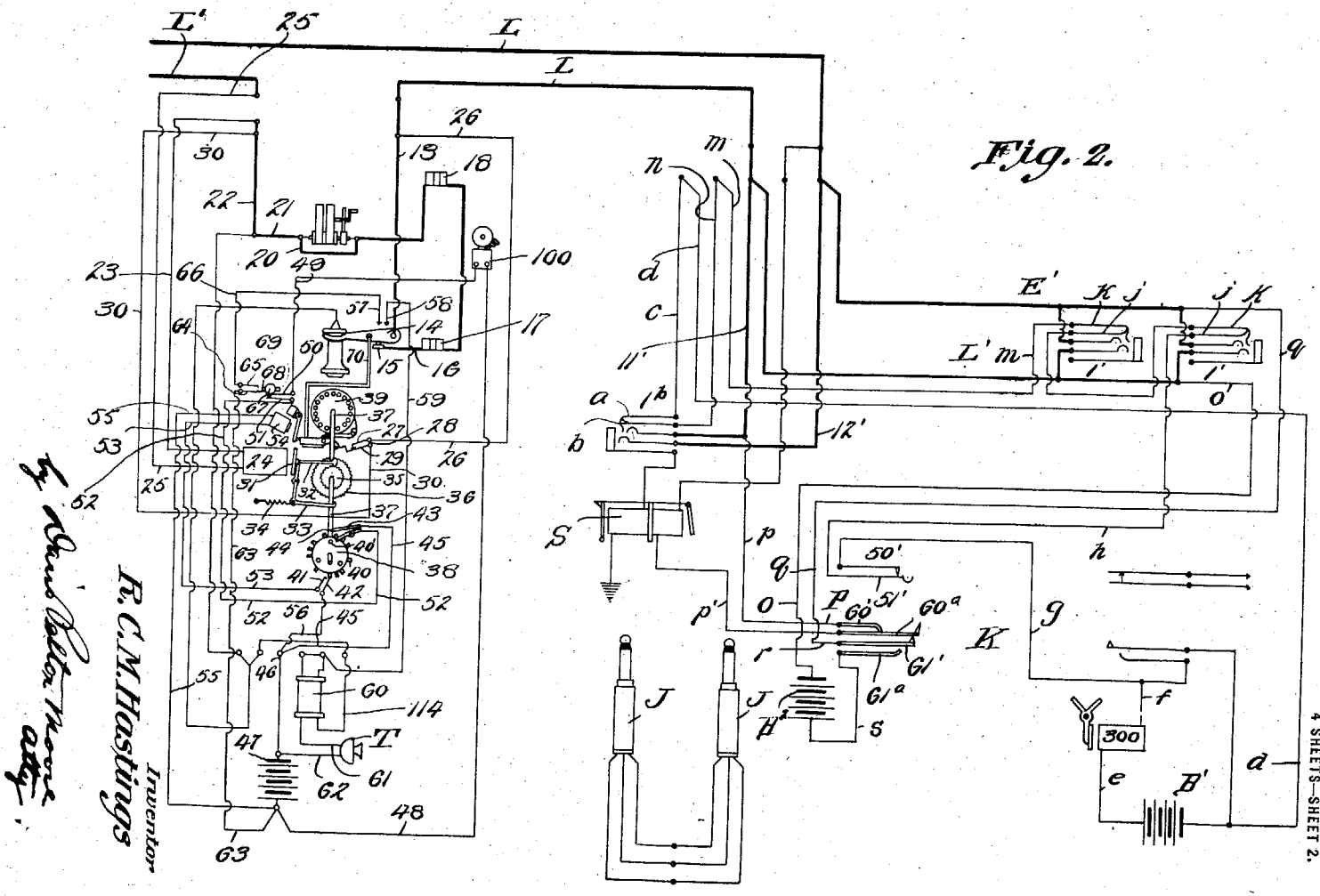
Fig. 2 is a similar view showing the apparatus used in connection with the present invention when a selecting key is employed on party line circuits.

In Fig. 2, constituting the diagram showing the employment of a selecting key K in lieu of the usual method of calling, and especially where the number of party lines are shown connected as in the aforementioned patent, the subscriber's set is identical with that heretofore described, the only difference being at the exchange. In the exchange E′ are located a calling and answering jack plug J, J′, respectively, the calling jack socket 1′ and the answering jack socket $1^b$. In this instance, the spring contacts 2, 6 and 9, are dispensed with and in lieu thereof are placed the respective normally closed spring contacts *a—b*, and *j—k* which are opened by the insertion of the respective jack plugs in the sockets 1′ and $1^b$, respectively.

Assuming that the substation has signaled the exchange E′, by once raising and lowering the receiver hook and then by operating the magneto M in the usual way, the contacts 27—29 being then open and the receiver hook being down, the exchange operator inserts the answering plug in the socket $1^b$ and thus opens the contacts *a—b*. The selecting key is then manipulated as set forth in my Patent No. 1,061,286, dated May 13, 1913, and the various shafts 37 of all substations are rotated, the uncalled substations being shunted from the line, while the contacts 43 and 44, are closed by its pins 40′, so that the call-up alarm 100 is energized. The elevation of the receiver R in the called substation elevates the weight 67 from the contacts 50 and 51, so that the call-up alarm circuit is open at this point, and the alarm is deënergized.

The selecting contacts 60′, $60^a$, 61′ and $61^a$ are disposed to be actuated by the selecting key mechanism and operate to throw the batteries $B^2$ upon the lines L, L′, and properly actuate the shaft 37 so as to rotate the disks 38 and 39, to effect the placing into the talking circuit of the selected and called subscribers' instruments and the shunting therefrom of the uncalled subscribers.

In order that the battery $B^2$ will not be diverted from the lines L—L′, when it is desired to actuate the electromagnets 24 of the system and thus simultaneously actuate the shafts 37, the contacts 60′—$60^a$ are provided. The contacts 60′—$60^a$ are opened when the contacts 61′—$61^a$ are closed, and vice versa. The circuit, when the contacts 61′—$61^a$ are closed, is as follows: the battery $B^2$ the conductor *s*, the contact $61^a$—61′, the conductors *r* and *q*, the line L to the substation, the conductor 25, the electromagnet 24, the conductors 23, 22, 21, 20 and 16, the contact 15, the receiver hook 14, the conductors 13 and L′, and the conductor *o*. The contacts 60′—$60^a$ in being opened, open the exchange signal S at the conductors *p—p′*.

Figure 4:
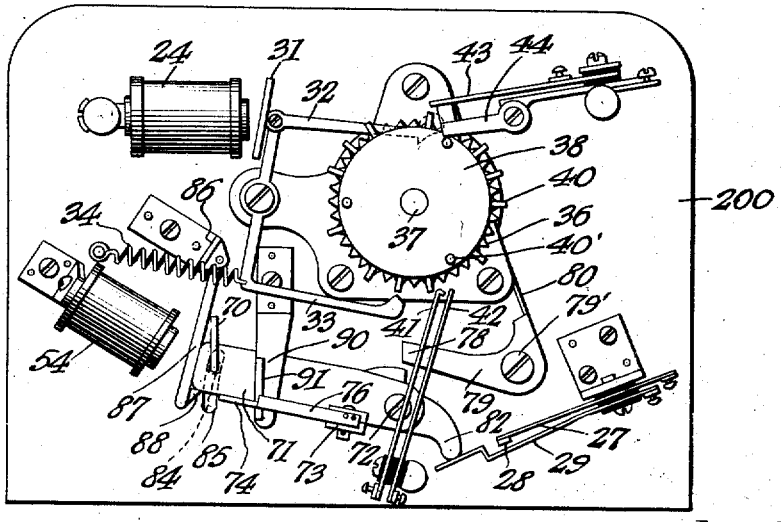
Fig. 4 is a similar view with the parts in the position they assume when the selected or called subscriber is placed in line but after the party called has removed the receiver from the hook, the automatic ringer circuit then being open.
Figure 10:
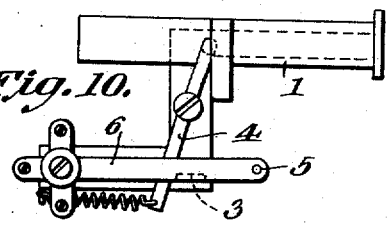
Figs. 10 and 11 are detail views of the jack plug with the automatic call-up alarm attachment thereon.
Figure 11:
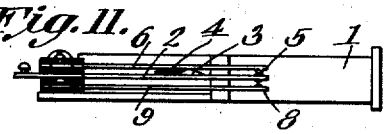
Figure 7:
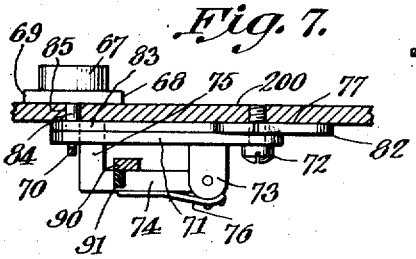
Fig. 7 is a section taken on line 7—7 of Fig. 3.

*Shunt and lock out device.*—One of the lock out or shunt devices on plate 200 is located in each subscriber's set, and carries the pivoted lever 71, which has its outer free end connected at all times to the receiver hook 14 through rod 70, so that the lifting of the receiver hook will also lift the lever 83, which is pivotally supported by means of the pin 72 to the plate 200. Carried by the lever 71 near the lower edge thereof is a frame 73 in which is pivoted the arm 74, whose hooked end 75 normally projects below the lever 83 and abuts the plate 200, the spring 76 normally holding the same in this position, and as clearly shown in Fig. 7. The lever 83 is provided with the shoulder 77 which is disposed in the path of to be abutted by the free end 78 of the bell crank lever 79, which is pivoted at 79′ to the plate 200 and is provided with the flat spring 80 which is disposed to have its free end engaged at all times by the pins 81 of the disk 39, said pins actuating the lever 79 to move the end 78 into and out of engagement with the shoulder 77 of the lever 83. This lever 83 is further provided with the downwardly projecting terminal 82 which is disposed to engage the free end of the contact 28, so that when the parts are in the position as shown in Fig. 3, the contacts 27 and 28 will be closed, but when moved to the position as shown in Fig. 4, the receiver hook having been raised the hooked terminal 82 will move the contact 28 downwardly and separate the same from the contact 27, thus opening the circuit at that point. Pivoted upon the same pin 72 is the lever 83 which carries a pin 84 which projects through the curved slot 85 of plate 200 and carries the weight 67 as before described.

Assuming the parts to be in the position as shown in Fig. 3, and the receiver is removed from the hook 14, the hook rises, pulling the link 70 so as to raise the lever 71 and through the hooked arm 74 will simultaneously lift the lever 83, thus lifting the weight 67 so as to permit the opening of contact arms 50, 51, stopping the alarm, and closing the contact arms 64, 65, and as the hook bridges the contacts 57—58, the transmitter and receiver are in the usual manner connected to the lines L—L′. The lifting of the lever 83, will elevate the pin 84 and weight 67 and thus permit the opening of the contacts 50 and 51. This opens the circuit to the bell 100. The trigger 87 not being affected by the magnet 54, is in the path to engage the free end of the lever 83, and thus lock it elevated, as shown in Fig. 4, and during the conversation. When the shaft 37 was moved to selecting position the pin 40 stopped just short of engaging the open contacts 41—42, so that after the completion of the conversation should either of the parties leave the receiver off the hook, the removal of the plug from the socket will cause the pin 40 to be moved and close the contacts 41—42 so that the magnet 54 is energized. This action will cause the armature trigger 87 to be moved toward the magnet 54 so that the pawl 88 is drawn from engagement with the lever 83. The lever 83 will then fall by gravity permitting the closing of contacts 27—29 to shunt the telephone set from the circuit. Weight 67 has also fallen closing the ringing circuit at 50 and 51, and opening the contacts 65 and 64 in the battery circuit. In order to release the lever 83 automatically, during the movement of the lever 71 upwardly, the plate 89 carrying the arm 90 is provided and carries the wedge-shaped piece 91 which is disposed to engage the inner side of the arm 74 and move the hook 75 outwardly to release the lever 83 and permit the weight 67 thereof to move by gravity to the position as shown in Fig. 3 if the magnet 54 is energized so that the catch 87 is withdrawn. In the position as shown in Fig. 3, the contacts 41 and 42 are opened so that the electromagnet 54 will be deënergized but as soon as the shaft 37 has been rotated a distance equal to one-half of the distance between the pins 40, the contact at 41 and 42 will remain broken by reason of the fact that the pins 40 are omitted from the first half step position. This permits any subscriber on the line to take down his receiver and converse with the exchange after the exchange operator has stepped the shafts 37 a proper number of steps, depending upon the particular substation, and the pivoted contact 44 will be engaged by a pin 40′ and moved into engagement with the contact point 43, thus deënergizing the electromagnet 54 and closing the circuit at 43—44 to ring the alarm 100, the weight 67 being down and in its lowermost position so that the contacts 50 and 51 are closed and the contacts 64, 65 open. This action takes place, as shown in diagram in Fig. 1, (with mechanism in position as shown in Fig. 4), when the calling plug is being placed within one of the calling jack sockets 1 and momentarily moves the contact 2 from point 5 to point 8, whereas under normal conditions, with the point 5 engaged by the contact 2, the device will assume the position as shown in Fig. 3.

The pins 40 are so disposed that when the shaft 37 has been further revolved in calling a subscriber in all uncalled sets, the contacts 41 and 42 are closed and thus the circuit with the battery 47, to energize the electromagnet 54, will be as follows: the battery 47, the conductors 46 and 56, the contacts 41 and 42, the conductor 53, the electromagnet 54 and the conductor 55. Should the receiver be off the hook 14 in any of the uncalled subscribers' sets, the energization of the electromagnets will attract the armature catch 87, and the lever 83 will fall and permit the closure of the shunt contacts 27 and 29 so that such uncalled substation will be shunted from the line. In all of the uncalled substations, where the receiver is upon the hook, the lever 83 is held down and the shunt contacts 27 and 29 are closed. In the calling and called substations, the contacts 41 and 42 are open, as one pin 40 is omitted at the position in which pin 40′ engages the contacts 43—44 for a called substation, and the circuit to the electromagnet 54 is open, so that the raising of the hook 14 will carry with it the lever 83, as indicated in Fig. 4, and the contact 29 will be separated from the contact 27, placing the shunt at the called and calling substations open with the substations properly connected to the line. At the same time that the called substation was connected either by the jack plug, as in Fig. 1, or the selecting key K, as in Fig. 2, the proper pin 40′ closed the contacts 43 and 44 and thus closed the local call-up alarm circuit to energize the call-up alarm 100, which remains energized until the called subscriber removes the receiver and the hook 14 is raised. Such action will lift the weight 67 and open the contacts 50 and 51 and thus the local circuit to the call-up alarm 100. The subscriber by placing the receiver upon the hook cannot depress the hook due to the fact that the spring 80 of the catch 79 is seated between the teeth of the ratchet 35 so as to place this catch 79 in engagement with the shoulder 27 to hold the lever 83 against movement. As the operator actuates the plug or the selecting key, the shaft 37 is rotated and the spring 80 engages the teeth of the ratchet 35 to release the catch 79 and consequently the lever 83. During this action the contacts 27—29 close. The pins 40 are so disposed as to when a substation is selected the contacts 43 and 44 are engaged and closed, whereas in other positions the same are open due to the disengagement of its respective pin 40′.

Figure 8:
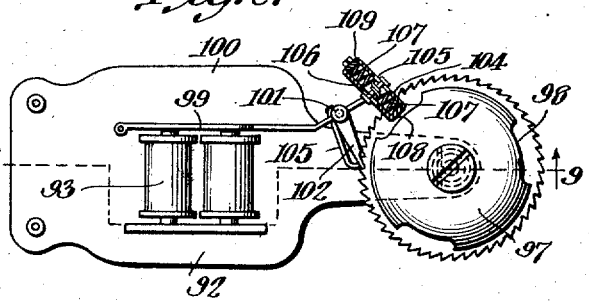
Fig. 8 is a detail elevation of the call-up alarm especially designed for operation in the present system.
Figure 9:
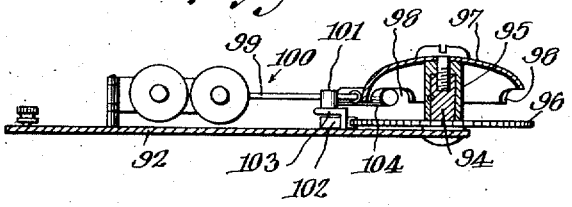
Fig. 9 is a section on line 9—9 of Fig. 8.

*Ringer alarm.*—In Figs. 8 and 9 is shown the detail structure of the preferred form of ringer alarm used with this apparatus, the same comprising a plate 92 having the electromagnets 93 which are connected to the respective wires 48 and 49 of the subscribers' sets, said plate 92 also carrying the rotatable stud 94 having keyed thereon a sleeve 95 which carries the large ratchet wheel 96 and the bell or other audible signal means 97. This bell is provided with a plurality of cut away portions 98 in line with the clapper 104, so that where the device is used on a party line although all of the electromagnets 93 may be energized, only that solid portion in line with the clapper 104 will be affected.

The armature 99 is disposed to be actuated by the electromagnet 93 and carries near its outer end a sleeve 101 to which is pivoted a pawl 102 actuated by the spring 103 and normally held in engagement with the teeth of the ratchet 96, so that the actuation of the armature will impart the desired lifting movement to the ratchet wheel 96 and thus rotate the bell 97 to bring the cut away portion 98 or solid portion thereof into alinement with the clapper 104.

The clapper 104 is made in the form of a tube provided with elongated diametrically disposed slots 105 in which is slidably mounted the pin 106 carried upon the extreme end of the armature 99, the slots permitting a slight movement of the pin 106 therein without affecting the tubular casing of the clapper 104. In order to produce a desired vibrating movement to the clapper 104, the two springs 107 are disposed within the casing, one of the springs being opposed to the sealed end 108 of the clapper casing while the other is opposed to the removable and adjusting plug 109 at the other end of the casing. The springs are connected to the pin 106 and thus normally hold the pin seated within the central portion of the respective slots 105.

As all of the respective coils or electromagnets 93 of the various subscribers' sets are of low tension winding, it is evident that a low voltage current may be employed for operating the same thus dispensing with the costly devices which are in vogue and permitting the employment of the usual form of electromagnets where the electric bells or buzzers are employed. It is also evident that these coils normally are actuated by the battery used by the telephone and that by reason of the fact that these bells are actuated by a mechanism in each individual subscriber's set, it is evident that the ringing key of the switch board with its necessary connection is dispensed with.

By the use of the call-up alarm herein set forth, it will be seen that the work of the operator at the exchange is lessened and that by reason of the fact that the selection of the subscriber due to the insertion of the calling jack plug will immediately connect the call-up alarm moving the alarm mechanism continuously and ringing the bell or buzzer, by intervals, until the receiver is removed from the hook of said called subscriber's set or until the jack plug is taken down. This will insure the necessary and automatic actuation of the calling-up feature in each subscriber's set and thus dispense with the work placed upon the exchange in connecting the called to the calling subscriber and actuating the ringer alarm until the called subscriber replies. It is also evident that this form of buzzer and lock out device may be connected to any telephone system now in use and dispense with the usual ringer at the exchange and its various connections, or that the device may be used in connection with the selecting key and system as shown in applicant's patent before mentioned.

*Operation.*—Referring to Fig. 1 and assuming the parts to be in the position as therein shown and that the operator has received a signal that a party is desiring to use the circuit, the jack plug is inserted in the usual manner, moving into contact with the abutment 4 and thus moving the spring contact 2 from engagement with the point 5 to the point 8. This action will open the line circuit and simultaneously throw in the storage battery B, located at the exchange. The contacts 2 and 5 are only open as the jack plug is passing the points 3, 4 so as to permit the storage battery in the line circuit to operate the electromagnet 24 in the various subscribers' sets. This action, energizing the electromagnet 24, will operate the pawls 32, 33, so as to rotate the shafts 37 one-half the distance between two pins 40. This action will open the contact points 41, 42 and close contact points 43, 44. The closing of the contacts 43, 44, the receiver being on the hook and the weight 67 down so as to close the contacts 50 and 51 and open the contacts 64, 65, will connect the ringer alarm 100 to the batteries 47 as heretofore described and thus cause the ringing of the alarm at the desired called subscriber's set which will continue ringing until the receiver R is raised from the hook 14 or until the jack plug is taken down. The lifting of the receiver from the hook will permit the hook to rise and through the contacts 57, 58 will connect the receiver and transmitter into the line, opening the contact points 50, 51 in the circuit to the bell 100 and closing the points 64, 65 so that the parties may now communicate. Should the called party have the receiver off the hook, when being called, the levers 71 and 83 will be raised and the trigger 87 will have engaged its pawl 88 with the lever 83, thus holding the lever 83 raised; but as previously described, the removal of the jack plug causing the energization of the magnet 54 due to the pin 41 closing contacts 41—42 and thus permit the release of the lever 83. As the hook 75 of the arm 74, due to the engagement of the arm 74 with the arm 90, has been held out of engagement with the lever 83, the lever 83 is thus free to fall by gravity under the influence of the weight 67, when the magnet 54 was energized, and assume its lowermost position. The weight 67 thus closes the contacts 50—51, and opens contacts 64, 65 (Fig. 5) so that the battery circuit will be opened until the receiver hook is again adjusted, thus saving the battery and permitting the alarm 100 to be in a position to be actuated, should the party be selected from the exchange, such selection from the exchange closing contacts 43—44, and closing the circuit including the alarm 100 and contacts 50—51. Should any of the receivers in the various substations be off the hooks, and even should the levers 83 and weights 67 be elevated and held elevated by the pawls 88, it is evident that the final movement of the disk 38, will cause the pins 40 to close their respective contacts 41—42, so that the magnet 54 will be energized and the various triggers 87 will be attracted to release the lever 83 which due to the weights 67 will fall and close the contacts 50—51 and open the contacts 64—65. This action places the substation in proper position to be rung from the exchange, even though the receiver remain off the hook. When the control mechanism of the substation is in the position as shown in Fig. 3, that is, with the contacts 27—29 closed, the substation is shunted from the line through the conductor 26, the contacts 27—29, and the conductor 30, but when the substation is calling central, or is free to respond after being selected and called, the contacts 27—29 are opened as in Fig. 4 by raising the receiver hook 14 and consequently the lever 71. From the foregoing it will be seen that the pins 40 control the contacts 41 and 42 while the pins 40′ control the contacts 43 and 44 and that when the disk is in selected position and the shunted contacts 27 and 29 are open, that the contacts 43 and 44 are closed.

What I claim as new is:

1. A telephone system, having an exchange station and a plurality of substations, each substation having a circuit including a local battery, a call alarm in the circuit, and means controlled by the insertion and removal of a calling plug in its socket at the exchange station to close and open the call alarm circuit.

2. A telephone system, having an exchange station and a plurality of substations, each substation having a local battery circuit, a transmitter and a receiver, another circuit including the battery of the local battery circuit, a call alarm in the last circuit, and means controlled by the insertion and removal of a calling plug in its socket at the exchange station to close and open the call alarm circuit.

3. A telephone system, having an exchange station and a plurality of substations, each substation having a circuit including a battery, a receiver hook forming one closure for said circuit, a call alarm in the battery circuit, said circuit being open when the hook is raised, and means controlled by the insertion and removal of a calling plug in its socket at the exchange station to close and open the call alarm circuit.

4. In a telephone system, the combination of an exchange and a plurality of substations, each of said substations including a receiver, a local battery circuit, a transmitter in said circuit, a call-up alarm connected in series with the battery, automatic means for connecting and disconnecting the call up alarm relative to the battery, manually operated means in the exchange for connecting a called to a calling substation and for automatically actuating the automatic means to connect the call-up alarm in the called substation with the battery to energize the call-up alarm, and a switch in the connection with the call-up alarm and battery controlled by the receiver in the called substation, whereby the removal of the receiver opens such switch and the call-up alarm circuit.

5. In a telephone system, the combination of an exchange and a plurality of subscribers' sets of instruments, an electromagnetically controlled circuit making device disposed in each subscriber's set and connected to the line, a call-up alarm in each set, an individual circuit connected therewith and controlled by said device, said circuit being normally open, a calling jack circuit to each set located in the exchange, and means in operable relation thereto actuated upon the insertion of the calling plug within the socket to actuate the device in the called subscriber's set to close the call-up circuit and actuate the alarm.

6. In a telephone system, the combination of an exchange and a plurality of subscribers' sets of instruments, a transmitter and a receiver in each set, an electromagnetically controlled circuit making device disposed in each subscriber's set and connected to the line, a call up alarm in each set, an individual circuit connected therewith and controlled by said device, said circuit being normally open, a calling jack circuit for each set located in the exchange means in operable relation thereto actuated upon the insertion of the calling plug within the socket to actuate the device in the called subscriber's set to close the call-up alarm circuit and actuate the alarm, and means controlled by the receiver hook in each subscriber's set for opening the call-up alarm circuit and connecting the transmitter and receiver to the line.

7. In a telephone system, the combination of an exchange and a plurality of subscribers' sets of instruments connected electrically for the transmission of intelligence; said subscribers' sets each having means controlled from the exchange for shunting the set from the line, a local battery, a transmitter and a receiver, a circuit including the local battery controlled by the shunting means, a call-up alarm in the last circuit; and means for calling the called subscriber's set in the exchange and for automatically closing the call-up alarm circuit of the called subscriber's set.

8. In a telephone system, the combination of an exchange and a plurality of subscribers' sets of instruments connected for the transmission of intelligence; said subscribers' sets each having means controlled from the exchange for shunting the set from the line, a local battery, a circuit including the local battery, a transmitter and a receiver, another circuit connected to said battery, a receiver hook controlled switch in said last circuit controlled by the receiver, it being closed when the receiver is upon the hook, a call-up alarm in the last circuit, and a second switch in the last circuit controlled by the shunting means; and means for connecting the calling subscriber's set and simultaneously actuating the shunting means in the called subscriber's set to close the second switch of the call-up alarm circuit to energize the alarm.

9. In a telephone system, the combination of an exchange and a plurality of subscribers' sets of instruments; said subscribers' sets each including a transmitter and a receiver and having means controlled from the exchange for shunting the sets from the line, and a call-up alarm connected to the local battery of the set; means for calling the called subscriber's set in the exchange and for automatically connecting the call-up alarm with the battery of the called subscriber's set, and means controlled by the receiver hook due to the removal of the receiver therefrom for disconnecting the call-up alarm circuit and for connecting the transmitter and receiver to the line.

10. In a telephone system, the combination of an exchange station and a plurality of sub-stations connected electrically, each sub-station having a transmitter, a receiver, a receiver hook, a local battery, a call-up alarm for connection with the local battery, means controlled from the exchange for shunting the sets from the line and for automatically connecting the call up alarm with the battery, and means controlled by the receiver hook due to the removal of the receiver therefrom for opening the call-up alarm circuit.

11. In a telephone system, the combination of an exchange and a plurality of subscribers' sets connected for the transmission of intelligence, an electromagnetically controlled means disposed in each subscriber's set and connected to the line, said means being operated due to the introduction and removal of a calling jack plug in a calling socket at the exchange, a call-up alarm in each subscriber's set, a circuit including the alarm and the battery of each set, a receiver lock, a pair of contacts normally open and disposed in operable relation in said circuit, and another circuit including said battery and controlled by said electro-magnetically controlled means for actuating the receiver lock.

12. A telephone system having an exchange station and a substation, a call-up alarm located in the substation, means controlled by the insertion and removal of the calling plug in its socket at the exchange station to close and open the call-up alarm circuit, a receiver in the substation, a receiver hook in the substation, and means controlled by the receiver hook whereby the call-up alarm may be energized whether the receiver hook is up or down.

13. A telephone system having an exchange station and a substation, a call-up alarm located in the substation, means controlled by the insertion and removal of the calling plug in its socket at the exchange station to close and open the call-up alarm circuit, a receiver in the substation, a receiver hook in the substation, and means controlled by the receiver hook whereby the call-up alarm may be energized whether the receiver is upon or off the hook.

14. A telephone system having an exchange station and a substation, a receiver hook in the sub-station, a source of electrical energy in the sub-station, a call-up alarm in the substation, and means controlled from the exchange for connecting the call-up alarm and the source of electrical energy regardless of the position of the receiver hook.

15. A telephone system having an exchange station and a substation, a call-up alarm in the substation, a receiver hook in the substation, means controlled at the exchange station for energizing the call-up alarm whether the receiver hook is up or down, and means controlled by the movement of the receiver hook for deënergizing the call-up alarm.

16. A telephone system, including an exchange and a substation, said substation having a step-by-step device mounted therein and controlled by the insertion or removal of the jack plug at the exchange station, a call-up alarm circuit in the substation, and a switch therein controlled by the step-by-step device, to be alternately opened and closed.

17. A telephone system including an exchange and a substation, said substation having a receiver hook, a step-by-step device mounted in the substation and controlled by the insertion or removal of the jack plug at the exchange station, a call-up alarm circuit in the substation, a switch therein controlled by the step-by-step device to be alternately opened and closed, and a second switch in said circuit automatically controlled by the receiver hook whereby the call-up alarm may be energized when the first switch is closed regardless of the position of the hook.

18. A telephone system including an exchange and a substation, said substation having a receiver hook, a step-by-step device mounted in the substation and controlled by the insertion or removal of the jack plug at the exchange station, a call-up alarm circuit in the substation, a switch therein controlled by the step-by-step device to be alternately opened and closed, a second switch in said circuit automatically controlled by the receiver hook whereby the call-up alarm may be energized when the first switch is closed regardless of the position of the hook, and means controlled by the receiver hook during its movement for controlling the second switch to open the circuit to deënergize the call-up alarm.

19. A telephone system including an exchange station and a substation, an electrically actuated step-by-step device mounted in the substation, said device being controlled by the insertion and removal of the calling plug in its socket at the exchange station, a call-up alarm circuit in the substation, and a switch in said circuit closed and opened by the step-by-step device whereby the insertion and withdrawal of the calling plug causes the energization and deënergization of the call-up alarm.

20. A telephone system including an exchange station and a substation, a receiver hook in the substation, an electrically actuated step-by-step device mounted in the substation, said device being controlled by the insertion and removal of the calling plug in its socket at the exchange station, a call-up alarm circuit in the substation, a switch in said circuit closed and opened by the step-by-step device whereby the insertion and withdrawal of the calling plug causes the energization and deënergization of the call-up alarm, a second switch in said circuit, means controlled by the receiver hook for causing the opening or closing of the second switch, and means for causing the closure of the second switch regardless of whether the receiver hook is up or down.

Columbus, Ohio, November 12th, 1917.

In testimony whereof I affix my signature.

RUBEN CHRISTOPHER MILLER HASTINGS.

Witnesses to Mr. Hastings' signature.
WILLIAM JOB,
M. E. ANDREWS.